United States Patent
Chen et al.

(10) Patent No.: US 10,924,820 B2
(45) Date of Patent: Feb. 16, 2021

(54) METHOD AND APPARATUS OF BITSTREAM RANDOM ACCESS AND SYNCHRONIZATION FOR MULTIMEDIA APPLICATIONS

(71) Applicant: MEDIATEK INC., Hsin-Chu (TW)

(72) Inventors: Lulin Chen, San Jose, CA (US); Shan Liu, San Jose, CA (US)

(73) Assignee: MediaTek Inc., Hsin-Chu (TW)

( * ) Notice: Subject to any disclaimer, the term of this patent is extended or adjusted under 35 U.S.C. 154(b) by 62 days.

(21) Appl. No.: 15/749,562

(22) PCT Filed: Aug. 5, 2016

(86) PCT No.: PCT/CN2016/093523
§ 371 (c)(1),
(2) Date: Feb. 1, 2018

(87) PCT Pub. No.: WO2017/024990
PCT Pub. Date: Feb. 16, 2017

(65) Prior Publication Data
US 2018/0213300 A1    Jul. 26, 2018

Related U.S. Application Data

(60) Provisional application No. 62/335,871, filed on May 13, 2016, provisional application No. 62/205,153,
(Continued)

(51) Int. Cl.
*H04N 21/845* (2011.01)
*H04N 21/61* (2011.01)
(Continued)

(52) U.S. Cl.
CPC ... *H04N 21/8455* (2013.01); *H04N 21/44016* (2013.01); *H04N 21/4621* (2013.01);
(Continued)

(58) Field of Classification Search
CPC .......... H04N 21/2343; H04N 21/4621; H04N 21/44016; H04N 21/8456; H04N 21/8455; H04N 21/6125
See application file for complete search history.

(56) References Cited

U.S. PATENT DOCUMENTS 9,992,555 B2    6/2018  Chen et al.
2008/0232467 A1  9/2008  Iguchi et al.
(Continued)

FOREIGN PATENT DOCUMENTS

CN    103004224 A    3/2013
CN    103039087 A    4/2013
(Continued)

OTHER PUBLICATIONS

Chen, L., et al.; "Signaling of open GOP structures;" International Organisation for Standardisation: Coding of Moving Pictures and Audio; Oct. 2015; pp. 1-3.
(Continued)

*Primary Examiner* — Shean Tokuta
*Assistant Examiner* — Juan C Turriate Gastulo
(74) *Attorney, Agent, or Firm* — Wolf, Greenfield & Sacks, P.C.

(57) ABSTRACT

A method and device for switching Representations are disclosed. On the server side, leading-picture information associated with leading pictures in an open GOP (group of picture) is signalled in a media presentation description. Each leading picture corresponds to one picture preceding a RAP (Random Access Picture) picture in a segment in an output order and being coded depending on the RAP picture. At the client side, an original Representation and a target representation are received and the leading-picture information for the target Representation is determined from the media presentation description received. A switched presen-
(Continued)

tation is presented, where the switched presentation switches from the original Representation to the target Representation by switching presentation from pictures in the original Representation to pictures in the target Representation at a stream access point (SAP) corresponding to the RAP picture in one segment of the target representation determined according to the leading picture information.

16 Claims, 5 Drawing Sheets

Related U.S. Application Data filed on Aug. 14, 2015, provisional application No. 62/202,588, filed on Aug. 7, 2015.

(51) Int. Cl.
  *H04N 21/462* (2011.01)
  *H04N 21/44* (2011.01)
  *H04N 21/2343* (2011.01)
(52) U.S. Cl.
  CPC ..... *H04N 21/6125* (2013.01); *H04N 21/8456* (2013.01); *H04N 21/2343* (2013.01)

(56) References Cited

U.S. PATENT DOCUMENTS

| 2012/0185570 A1* | 7/2012 | Bouazizi | H04N 21/44016 |
| | | | 709/219 |
| 2012/0230433 A1* | 9/2012 | Chen | H04N 19/70 |
| | | | 375/240.25 |
| 2013/0117418 A1 | 5/2013 | Mutton et al. | |
| 2016/0373777 A1* | 12/2016 | Pettersson | H04N 21/845 |
| 2018/0007395 A1* | 1/2018 | Ugur | H04N 21/21805 |

FOREIGN PATENT DOCUMENTS

| JP | 2010-154502 A | 7/2010 | |
| WO | 2012/003237 A1 | 1/2012 | |
| WO | 2012/011076 A1 | 1/2012 | |
| WO | WO-2012003237 A1 * | 1/2012 | ......... H04N 21/6587 |
| WO | 2014051410 A1 | 4/2014 | |
| WO | WO-2017202699 A1 * | 11/2017 | ......... H04N 21/235 |

OTHER PUBLICATIONS

Chen, L., et al.; "Seamless switching with a temporal processing descriptor;" International Organisation for Standardisation: Coding of Moving Pictures and Audio; Oct. 2015; pp. 1-5.

Chen, Y., et al.; "Response to the CfP on HTTP Streaming: Adaptive video streaming based on AVC;" International Organisation for Standardisation: Coding of Moving Pictures and Audio; Jul. 2010; pp. 1-20.

Mitic, R.; "Signalling DRAPs in the ISOBMFF;" International Organisation for Standardisation: Coding of Moving Pictures and Audio; Jun. 2015; pp. 1-7.

International Search Report dated Oct. 31, 2016, issued in application No. PCT/CN2016/093523.

* cited by examiner

METHOD AND APPARATUS OF BITSTREAM RANDOM ACCESS AND SYNCHRONIZATION FOR MULTIMEDIA APPLICATIONS

CROSS REFERENCE TO RELATED APPLICATIONS

The present application is a national stage filing under 35 U.S.C. § 371 of International Patent Application Serial No. PCT/CN2016/093523, filed Aug. 5, 2016, which claims priority to U.S. Provisional Patent Application, Ser. No. 62/202,588, filed on Aug. 7, 2015, U.S. Provisional Patent Application, Ser. No. 62/205,153, filed on Aug. 14, 2015 and U.S. Provisional Patent Application, Ser. No. 62/335,871, filed on May 13, 2016. The U.S. Provisional Patent Applications are hereby incorporated by reference in their entireties.

TECHNICAL FIELD

The present invention relates to media streaming over Internet. In particular, the present invention relates to method and device to render seamless switching between two streams containing segments using open GOP (Group of Pictures) structure.

BACKGROUND

HyperText Transfer Protocol (HTTP) is a set of standards that allow users of the World Wide Web to exchange information found on web pages. It has been de facto standard for Internet access today. Browsers from various developers all support the HTTP as the communication protocol to connect a client to Web servers on the Internet. Through HTTP, a connection between a user and a server can be established so that HTML (HyperText Markup Language) pages can be sent to the user's browser. The protocol can also be used to download files from the server either to the browser or to any other requesting application that uses the HTTP.

In recent years, video streaming over Internet has been an important application. Today, video streaming contributes to the most Internet traffic. Various multimedia streaming protocols have been widely used and some of the protocols are based on the HTTP. Dynamic Adaptive Streaming over HTTP (DASH), also known as MPEG-DASH, is an adaptive bitrate streaming technique that enables media content delivery over the Internet based on the conventional HTTP web servers.

In the DASH standard, media stream switching (i.e. Representation switching) and seeking are supported. Basically the DASH client needs to access SAP (Stream Access Point) in Representations for a desired switching time or seeking position. The Representation corresponds to a collection and encapsulation of one or more media streams in a delivery format and associated with descriptive metadata. The conditions for the operations may involve attribute settings such as @segmentAlignment, @startWithSAP, @mediaStreamStructureId, and etc. In general, the operations tie to SAP with a type number of 1, 2 or 3 as described in "Dynamic adaptive streaming over HTTP (DASH)—Part 1: Media presentation description and segment formats", ISO/IEC 23009-1, May 2014. Today's streaming services generally use SAP of Type 1 or 2 (i.e., a closed GOP (Group of Pictures) structure) and desire to use SAP of Type 3 (i.e., an open GOP structure) for balancing the service and bandwidth efficiency.

The DASH core experiment—SAP-Independent Segment SIgnaling (SISSI) as reported in m36597 (T. Stockhammer, ISO/IEC JTC1/SC29/WG11, "CE-SISSI Report", m36597, Warsaw, Poland, June 2015) considers enabling the relaxation of most profiles, where each segment starts with a SAP of type 1 or 2. In addition to the signalling, one of the basic and essential features in the core experiment is to support switching between Representations efficiently and accurately. In m36167 (M. M. Hannuksela, ISO/IEC JTC1/SC29/WG11, "CE-SISSI: Supplemental property descriptor for seamless switching with open GOPs", m36167, Warsaw, Poland, June 2015), a method based on Supplemental Property Descriptor for seamless switching with open GOPs is proposed. As disclosed in DASH, the descriptor elements are structured in the same way to contain a @schemeIdUri attribute that provides a URI to identify the scheme and optional attribute @value and optional attribute @id. The semantics of the element are specific to the scheme employed. The URI (Uniform Resource Identifier) identifying the scheme may be a URN (Uniform Resource Names) or a URL (Uniform Resource Locator). For the element SupplementalProperty, the Media Presentation author expresses that the descriptor contains supplemental information that may be used by the DASH client for optimized processing.

For a media segment/movie fragment in a Representation with open GOPs, some access units may need to use reference information from previous media segment/movie fragment, which may not be available when the switching occurs. In addition, if desired switching is across Representations with different spatial resolutions, re-sampling of reference pictures is recommended for an improved picture quality of leading pictures of a random access point. Such a re-sampling processing support is left to applications and corresponding decoding to decide. For adaptive GOP structure (e.g., different GOP structures or different GOP sizes) based media segments which can usually provide more coding efficiency, but the switching becomes complicated or even impossible. The leading picture is defined as a picture preceding and associated with an IRAP (Intra Random Access Point) picture in output order. The Intra picture in each GOP is an IRAP picture. The leading picture is coded depending on the IRAP picture. For open GOPs, in addition, the leading picture may be coded depending on the previous picture as well.

In DASH, @startWithSAP is one of the common attributes in Adaptation Set, Representation, Sub-Representation, which specifies that each Media Segment in the associated Representations starts with a SAP not bigger than the attribute value in case it is present and bigger than 0. Adaptation Set corresponds to a set of interchangeable encoded versions of one or several media content components as specified in DASH. SAP represents Stream Access Point, which corresponds to a selected position in a Representation to enable starting playback of a media stream using only the information contained in Representation data. The play back will use the information in the Representation starting from the selected position onwards, which may include information preceded by initializing data in the Initialization Segment if any. According to XML (EXtensible Markup Language) convention, attributes are identified by a lower-case first letter and are preceded by an '@' sign. The convention is used in this disclosure.

In DASH, @segmentAligment, @sub-segment Alignment, and @startWithSAP are used jointly in switching Representations. Usage examples of those attributes are provided in appendix A.6 of the DASH specification in both DASH-part 1 and 3GP-DASH.

In DASH, @mediaStreamStructureId is one of the attributes in Representation, which indicates a list of identifier values of media stream structure. According to the description of the attribute in DASH specification, sharing same media stream structure identifier has a specific indication with regard to SAP (Stream Access Point) as specified in the description of @mediaStreamStructureId. The attribute is used to provide bitstream structure identifier values list, which is used for the purpose of switching between different streams. With the bitstream structure identifier values list, whether two bitstreams have a same bitstream structure can be determined. Bitstream switching can occur at a certain RAP (Random Access Point). A use case of multiple media stream structure identifier values has been noted in the description of @mediaStreamStructureId as described below. Specifically, in a certain bitstream switching use case using multiple bitstream structure identifier values, if Representation B shares a bitstream structure identifier value, which is present in Representation A and Representation C, then bitstream switching between Representations A and B, and switching between Representations B and C are allowed. However, if Representations A and C do not share a same bitstream structure ID, then switching between different Representations A and C are not allowed. In other words, bitstream switching between Representations A and C across B could be realized using multiple media stream structure identifier values.

In W15526 (Stockhammer, et al, "Technologies under Consideration for Dynamic Adaptive Streaming over HTTP 23009, parts 1, 3 and 4", W15526, ISO/IEC, Warsaw, Poland, June 2015), mechanisms of Segment-Independent SAP Signalling to support advanced use cases with low latency services and seamless switching are disclosed.

On the other hand, the HEVC standard specifies several picture types such as IDR (Instantaneous Decoding Refresh), IRAP (Intra Random Access Point), CRA (Clean Random Access), BLA (Broken Link Access), RASL (Random Access Skipped Leading (Picture)), and RADL (Random Access Decodable Leading (Picture)) pictures and corresponding decoding process to ensure those picture types can be correctly decoded or handled by a HEVC media format decoder in an application. It still remains to be seen more how various applications can make use of the features of those picture types for synchronization such as channel change and bitstream switching.

In general, all I-pictures can be used as a random access point. However, in encoding process, the encoder may not know the actual applications that the underlying media data will be used. Therefore, the decision to code random access point I-pictures as IDR pictures or BLA pictures may not be able to take all possibilities into consideration. Therefore, in practice, most I-pictures are encoded as regular I-pictures (i.e., non-IDR and non-BLA) in either a closed GOP or an open GOP. The open GOP structure allows coding of leading pictures at the beginning of the GOP to rely on the Intra picture in the GOP and the picture in the previous GOP. Therefore, an open GOP often results in more efficient coding and most systems use open GOP structure in practice. Exposure of GOP coding structures to the upper layer such as MPEG FF (MPEG File Format) and MPEG DASH MPD makes it useful for applications to perform all kinds of possible random access. According to DASH, Media Presentation Description (MPD) is formalized description for a Media Presentation for the purpose of providing a streaming service.

When an I-picture in an open GOP is signalled as a possible synchronization or switching point in applications, the associated random access skipped leading pictures (i.e., RASL picture) as described in the HEVC standard may not be correctly decodable, since the RASL picture may contain references to pictures that are not present in the bitstream. Therefore, switching Representations involved open GOP structure needs to be handled carefully to ensure correct decoding and presentation.

SUMMARY

A method and device for switching Representations are disclosed. On the server side, a video bitstream is divided into segments, where each segment belongs to a segment-type group including an open-GOP (Group of Pictures) type. Pictures in each segment having the open-GOP type are coded with zero or more leading pictures (zero also means a closed GOP). Each leading picture corresponds to one picture preceding a RAP (Random Access Picture) picture of the segment in an output order and coded depending on the RAP picture of the segment and possibly the picture in previous segment. The leading-picture information is signalled in the media presentation description, the Representation, the Adaptation Set, the manifest file, or the similar description file comprising information about the video stream content, where the leading-picture information is associated with the number of the leading pictures in each segment having the open-GOP type. The RAP picture may correspond to an Intra picture. Alternatively, the RAP picture may correspond to a DRAP (dependent RAP) picture, where each DRAP picture corresponds to a P-picture or a B-picture.

In the media presentation description, the leading-picture information may be signalled using an attribute in the Representation or the Adaptation Set. The leading-picture information may be signalled using a supplemental property descriptor in the Representation or the Adaptation Set. The supplemental property descriptor may also include a first indication and a second indication, and where the first indication indicates to a decoder whether to continue to decode and present the pictures in original Representation and the second indication indicates to the decoder whether to always present a higher quality-ranking picture or a higher-resolution picture of two pictures from two streams to be switched at a stream access point (SAP).

For a client device, the method receives an original Representation associated with a current media stream received and a target Representation associated with a target media stream. The original Representation comprises multiple first segments having first GOP structure and the target Representation comprises multiple second segments having second GOP structure. The leading-picture information associated with zero or more leading pictures in each second segment of the target media stream is determined by an attribute or a supplemental property descriptor in the Adaptation set or Representation. A switched presentation is presented, which switches from the original Representation to the target Representation by switching presentation from pictures in the original Representation to pictures in the target Representation at SAP corresponding to the RAP picture in one second segment determined according to the leading picture information.

The supplemental property descriptor may further include a first indication to indicate to a decoder regarding whether to continue to decode and present N pictures in original Representation. When N is greater than 0 and the first indication has a value of 1, N leading pictures are decoded and presented in the original Representation and then the first I-picture (i.e., Intra picture) associated with the SAP of the target Representation is decoded, and N leading pictures with presentation times smaller than presentation time of the Intra picture associated with the SAP of the target Representation are discarded or set to be non-presented in a decoding process. The supplemental property descriptor may further include a second indication to indicate to the decoder regarding whether to always present a higher quality ranking picture or a higher-resolution picture of two pictures at the SAP. When the second indication has a value of 1, the Intra picture associated with the SAP of the target Representation and an anchor picture in the original Representation at a same time as the SAP of the target Representation that has a high quality ranking is presented. When the second indication has a value of 0, either the Intra picture associated with the SAP of the target Representation or the anchor picture in the original Representation at the same time as the SAP of the target Representation is presented. When N is 0, the first indication is ignored.

In another embodiment, the RAP picture corresponds to a DRAP (dependent RAP) picture, where each DRAP picture corresponds to a P-picture or a B-picture. If N is greater than 0 and the RAP picture associated with the SAP of the target Representation as Sync Sample is indicated, a first variable is set to indicate handling one Clean Random Access picture as one Broken Link Access picture and the first variable then is used to set a second variable to indicate decoding process for generating unavailable reference pictures corresponding to said handling one Clean Random Access picture as one Broken Link Access picture is invoked.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
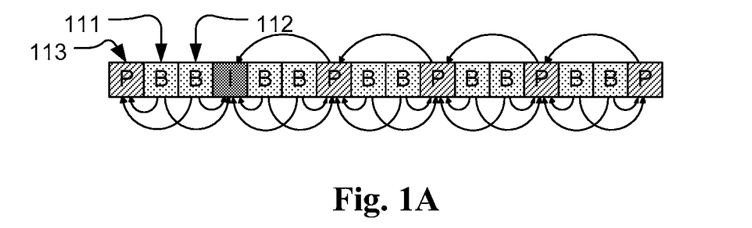
FIG. 1A illustrates an example of open GOP (Group of Pictures) structure having two leading pictures.
Figure 1B:
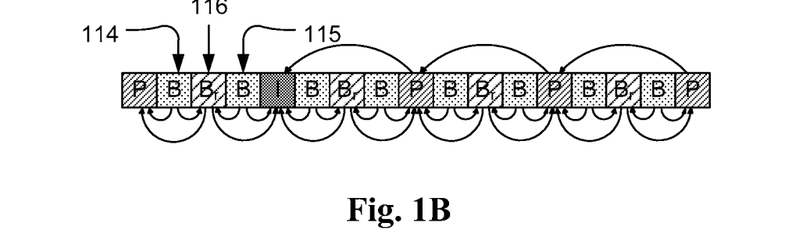
FIG. 1B illustrates an example of open GOP (Group of Pictures) structure having three leading pictures including one reference B-picture.

FIG. 1A and FIG. 1B show two examples of GOP structure for the sequence of pictures/access units in the presentation order, where the Intra picture is a SAP of Type 3 rather than an IDR (Instantaneous Decoder Refresh) picture. The IDR picture is an Intra frame with decoder refresh point. In other words, it is an open GOP structure based media segment with the advantage of more efficient coding to result in a lower coding rate. The arrow lines indicate the coding reference dependency. The I-, P- and $B_r$-pictures are termed as anchor pictures in this disclosure, which means that they may be used as a reference picture. In FIG. 1A, only traditional B pictures are used, which are not referenced by other pictures. These two B-pictures (111 and 112) preceding the I-picture in the presentation order are dependent on the I-picture. On the other hand, the P-picture (113) preceding the I-picture is not a leading picture since it is not dependent on the I-picture in this GOP. Accordingly, these two B-pictures are referred as leading pictures. In FIG. 1B, reference B (i.e., $B_r$) picture are also used, which are referenced by other pictures. The $B_r$-picture (116) preceding the I-picture is also a leading picture along with the two B-pictures (114, 115). The B-picture (114) is dependent on the $B_r$-picture (116), which is dependent on I-picture. Therefore, the B-picture (114) is also dependent on I-picture and is considered as a leading picture.

With the open GOP structure, the first few B pictures may not be decodable if the first P picture is not available at the time of decoding, due to either a random access processing that the P picture does not exist in a decoder, or a bitstream/Representation switching that the P picture may belong to a previous segment in a different Representation. Decoding and processing of those B pictures, referred as leading pictures, usually is a best-effort decoding process in a typical application. It may often cause display erroneous or frozen, and may even stop the decoding process. In some practices, those leading pictures are identified and therefore are discarded with a black display at switching.

In order to overcome the leading picture decoding issue as mentioned above, the present invention discloses a temporal processing scheme with Supplemental Property Descriptor for Adaptation Sets or Representations, which contain video media component specified in the DASH standard (ISO/IEC 23009-1). The scheme provides video media component information of temporal relationship of containing access points. It can be used in decoding and presentation processes for seamless switching or access quality when switching or random access is executed.

The names of the foregoing parameters are for illustration purpose only, and shall not be construed as to limit the scope of the present invention.

Figure 2:
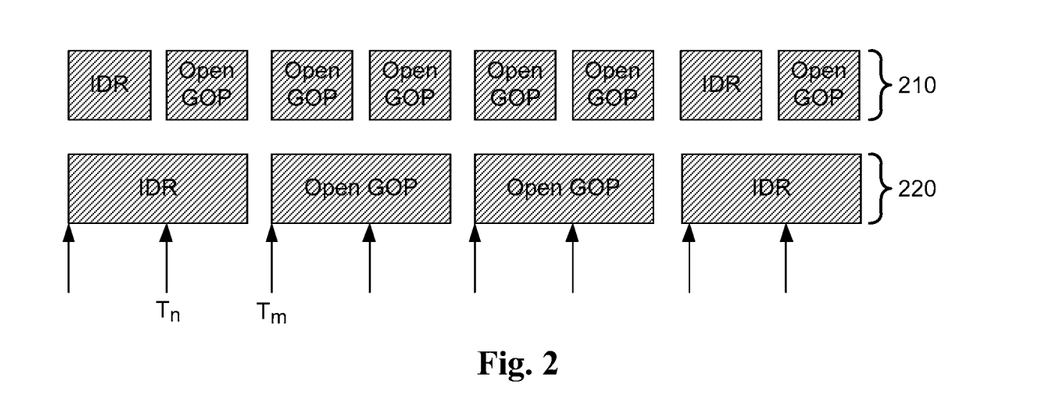
FIG. 2 illustrates an example of two Representations for a possible switching, where the segment size of the Representation 2 (bottom row) is twice as large as that of Representation 1 (top row). In both Representations, the segments start with an IDR or as an open GOP.

FIG. 2 illustrates an example of two Representations (210 and 220) for possible switching, where each Representation contains equal-sized segments. The segment size of the Representation 2 (220) is twice as large as that of Representation 1 (210). Signalling such segment structures may be out of the scope of this invention.

Representation 1 may be encoded with a higher bitrate and therefore has a higher quality ranking comparing to Representation 2. The two Representations may also have different picture resolutions. The scheme described in the present invention is for a possible switching at Time $T_n$ or Time $T_m$ between the two Representations as indicated in FIG. 2, where $T_n$ corresponds to a possible switching point for a segment in Representation 1 and $T_m$ corresponds to a possible switching point for a segment in both Representation 1 and Representation 2. The switching point is also referred to as the stream access point (SAP). While the two exemplary Representations are shown to be aligned, the present invention is not limited to switching for aligned Representations.

According to DASH standard (ISO/IEC 23009-1), a Supplemental Property Descriptor (i.e., SupplementalProperty) is defined. For the element SupplementalProperty, the Media Presentation author expresses that the descriptor contains supplemental information that may be used by the DASH client for optimized processing. In this scheme, the value of the @schemeIdUri of the SupplementalProperty element for this temporal processing description is equal to urn:mpeg:dash:temporalprocessing:2015. Attribute @value of the SupplementalProperty element using this temporal processing scheme is a space separated list of three values corresponding to (numDiscardablePics contOrigPicPresentation tgtIPicPresentation). The semantics of these three values of the SupplementalProperty element are described as follows.

Value numDiscardablePics is an integral value of 0 to N, indicating the number of pictures with smaller presentation times than that of I-picture of a SAP, i.e., the leading pictures of the targeted switching Representation. When a streaming client receives a value of numDiscardablePics in Supplemental Property Descriptor, it has an option to process those leading pictures in terms of the scheme values specified in this invention below that the leading pictures may be discarded or set to be non-presented. Therefore, the I-picture will become the first picture of the segment in the targeted switching Representation.

Value contOrigPicPresentation is a flag with a value of 0 or 1. The default is set to 1. When numDiscardablePics>0, contOrigPicPresentation equal to 1 means that a decoder continues to decode and present N (i.e., numDiscardablePics) pictures in its original Representation followed by decoding the I-picture of SAP of the targeted switching Representation onward. The numDiscardablePics pictures with smaller presentation times than that of I-picture in the targeted switching Representation (i.e., the leading pictures) will be discarded or set to be none-presented in decoding process to satisfy the overall presentation timeline. In other words, according to the present invention, the I-picture decoding time in the targeted switching Representation is postponed by a period of numDiscardablePics pictures and its presentation time becomes earliest presentation time of the segment in order to keep the presentation time aligned after switching. When numDiscardablePics is equal to 0, contOrigPicPresentation is ignored and contOrigPicPresentation equal to 0 is undefined.

Figure 3:
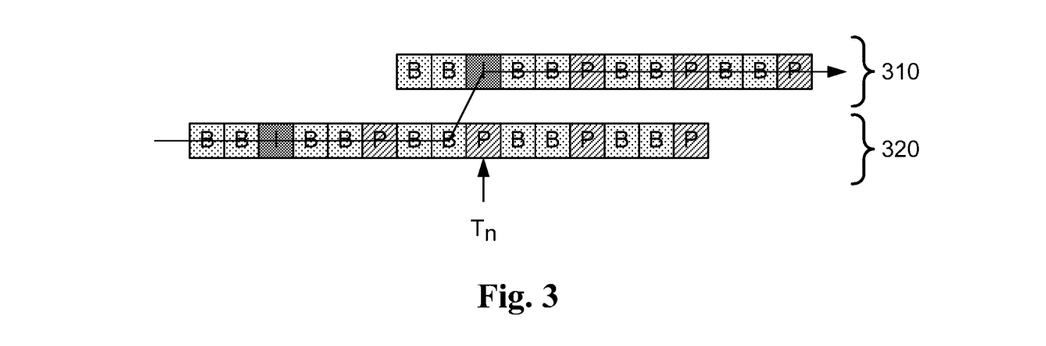
FIG. 3 illustrates an exemplary switching at time $T_n$ of an anchor P-picture with the same GOP structures according to an embodiment of the present invention.
Figure 4:
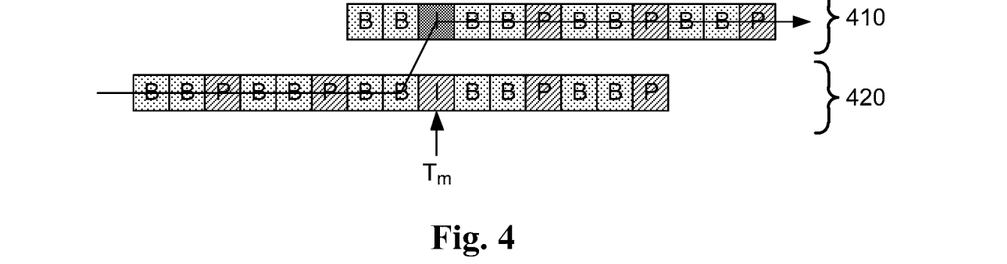
FIG. 4 illustrates an exemplary switching at time $T_m$ of an anchor I-picture with the same GOP structures according to an embodiment of the present invention.

Value tgtIPicPresentation is a flag with a value of 0 or 1. The default is set to 1. The switching may occur at an anchor picture such as I-, P- or $B_r$-picture in the original switching Representation. The original switching Representation may have the same presentation time as that of I-picture in the targeted switching Representation. In this case, when contOrigPicPresentation is set to 1 and if tgtIPicPresentation is equal to 1, a decoder shall present the picture with a higher quality ranking (e.g., coded with a higher bitrate) or a higher picture resolution of the two pictures at a switching point such as $T_n$ or $T_m$. If tgtIPicPresentation is equal to 0, a decoder has the option to present either anchor pictures. When numDiscardablePics or contOrigPicPresentation is set to 0, tgtIPicPresentation is ignored. FIG. 3 and FIG. 4 show two examples according to this method. In FIG. 3, the switching from Representation 2 (320) to Representation 1 (310) takes place at $T_n$ of the first I-picture of Representation 1 (310) corresponding to an anchor P-picture of Representation 2 (320). In FIG. 4, the switching from Representation 2 (420) to Representation 1 (410) takes place at $T_m$ of the first I-picture of Representation 1 (410) and Representation 2 (420).

Assuming the two Representations (i.e., the original switching Representation and the targeted switching Representation) have the same GOP structure, but different GOP sizes (e.g. FIG. 1A or FIG. 1B in presentation order), then numDiscardablePics is equal to 2 for FIG. 1A and numDiscardablePics is equal to 3 for FIG. 1B. For contOrigPicPresentation equal to 1 and tgtIPicPresentation equal to 1, FIG. 3 illustrates such an example of the presentation path in time (the same GOP structure, but different GOP sizes) when switching at $T_n$ from Representation 2 to Representation 1. The two leading pictures are either discarded or non-presented and the P-picture of Representation 2 at the switching point is decoded but not presented. FIG. 4 illustrates an example of the presentation path in time when switching at $T_m$. Similarly, the leading pictures are either discarded or none-presented and the I-picture of Representation 2 at the switching point is decoded but not presented.

As shown in FIG. 3 and FIG. 4, the switching point is always at the I-picture for the targeted switching Representation. It means the scheme describes only a SAP structure of the segment in the targeted switching Representation and the processing of the leading pictures and those pictures overlapped with the leading pictures in time in the original switching Representation.

Figure 5:
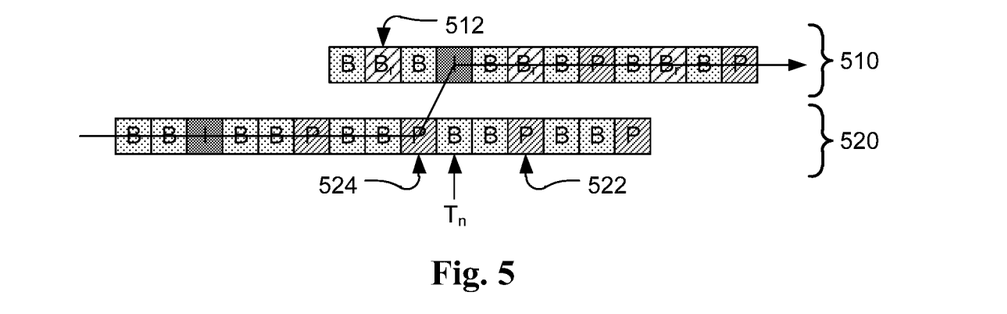
FIG. 5 illustrates an exemplary switching at time $T_n$ of a B-picture with different GOP structures according to an embodiment of the present invention.
Figure 6:
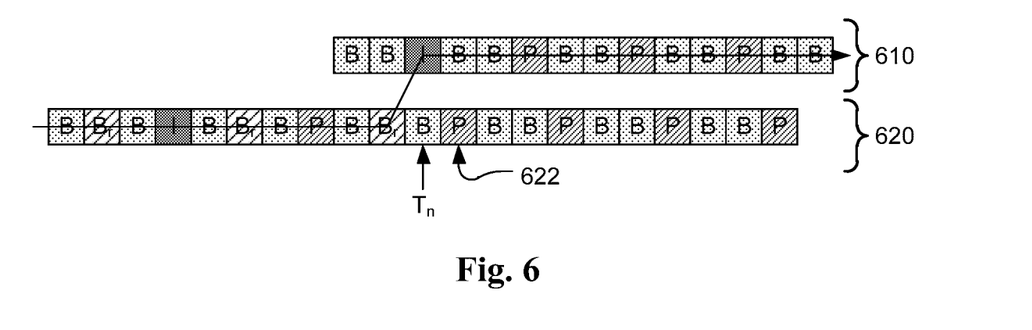
FIG. 6 illustrates another exemplary switching at time $T_n$ of a B-picture with different GOP structures according to an embodiment of the present invention.

The switching may not occur at an anchor picture of the original switching Representation as shown in FIG. 5, where the switching occurs at a B-picture. FIG. 5 shows an example of the switching with a reference B picture (512) in the leading pictures of the targeted switching Representation (510) from an original Representation (520) (i.e. the two representations have different GOP structures). In this case, numDiscardablePics is equal to 3. The P-picture (522) in the original Representation (520) after $T_n$ does not need to be decoded. The P-picture (524) before $T_n$ is decoded and presented in terms of the overall presentation timeline. FIG. 6 shows another example of the switching with a reference B-picture (i.e., a $B_r$-picture) in the original Representation (620) to a target Representation (610). In this case, numDiscardablePics is equal to 2. The P-picture (622) after $T_n$ as a reference picture for the B picture at $T_n$ is decoded, but not presented according to the overall presentation timeline. Same as FIG. 3 and FIG. 4, the switching point is the I-picture for the targeted switching Representation and any picture for the original switching Representation.

Figure 7:
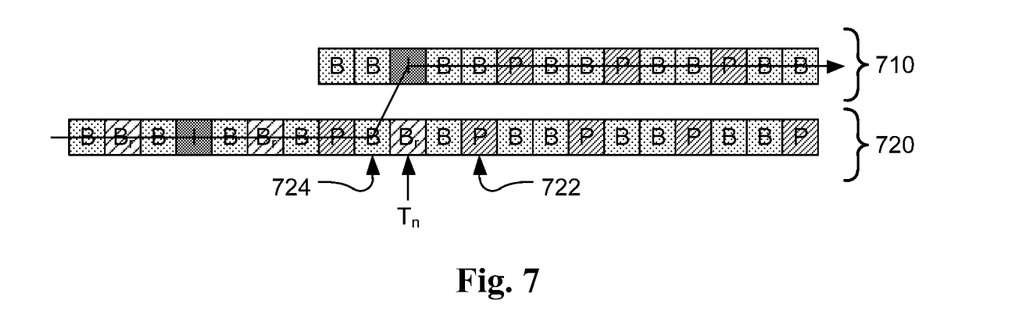
FIG. 7 illustrates another exemplary switching at time $T_n$ of an anchor $B_r$-picture with different GOP structures according to an embodiment of the present invention.

In FIG. 7, both the $B_r$-picture at $T_n$ and P-picture (722) after it are reference pictures for the B picture (724) before switching from the original Representation (720) to the targeted Representation (710). According to the overall presentation timeline, the P-picture (722) is decoded but is not presented, and $B_r$-picture at $T_n$ is decoded and may set to be presented in terms of the value of tgtIPicPresentation as the case of switching at an anchor picture in FIG. 3 or FIG. 4.

In the foregoing examples, the I-picture of the targeted switching Representation associated with the switching point is referred as the RAP (Random Access Picture) picture. This scheme does not need to reconstruct reference pictures for the targeted switching Representation when the switching is executed, since the reference dependency has been kept within the original Representation as shown in the above examples according to the present invention. For the same reason, in the case of two Representations with different resolutions, it does not need to resample the reference pictures for an improved visual picture quality of the leading pictures as disclosed in m36167.

This scheme can also be applied to switching beyond Adaptation Sets or between streaming programs or channels. In the case of tuning in a streaming program or channel, the value of numDiscaredablePics indicates the number of leading pictures may be discarded or none-presented, while ignoring the two values of contOrigPicPresentation and tgtIPicPresentation as no original Representation is involved.

Based on W15526, the present invention discloses a method to signal information related to the open GOP structure, such as the number of leading pictures of given a SAP of Type 3, in Adaptation Sets and Representations. With the open GOP structure information incorporated at levels of Adaptation Sets and Representations, a DASH client will have options to do a temporal processing with an application scheme toward seamless switching and random access.

With W15526, the following conditions are assumed as an example: a segment is 0.5 second of duration and the frame rate is 50 fps, the signalling is as follows for the above Adaptation Set in FIG. 2.

AdaptationSet
      @timescale=50
      SegmentTimeline.S: @t=0, @d=25, @r=−1
      Switching: @period=150, @type="media"
      Switching: @period=50, @type="open GOP"
      SegmentTemplate@media="http://example.com/
        $RepresentationID$"/se
    gment_$Time$.mp4
        Representation: @id=1,
          @randomAccessPeriod=25
        Representation: @id=2,
          @randomAccessPeriod=50.

In addition to the extensions proposed in m36167 (M. M. Hannuksela, "*CE-SISSI: Supplemental property descriptor for seamless switching with open GOPs*", m36167, Warsaw, Poland, June 2015), the present invention discloses a method to add a new attribute @numberLeadingPicture in Representation level. The signalling for the Representations with FIG. 2 according to an embodiment of the presentation is as follows:

Representation: @id=1,
      @randomAccessPeriod=25,
      @numberLeadingPicture=3;
    Representation: @id=2,
      @randomAccessPeriod=50;
      @numberLeadingPicture=3.

In some applications, the open GOP structure varies with a varied number of leading pictures for Representation, such as adaptive GOP structure. Thus @numberLeadingPicture may have different values for each Representation.

The number of leading pictures provides temporal information of Type 3 SAPs. Without parsing media stream, a DASH client may use the information to build better schemes for seamless switching and random access between Representations, Adaptation Sets, or even between programs/channels.

In the above disclosure, the coded GOP structure may be signalled in MPD (media presentation description) and specifically with the number of leading pictures of given a SAP of Type 3 in Adaptation Sets and Representations. Also, the coded open GOP structures may be signalled with the SupplementalProperty descriptor, one of the scheme values indicates the number of leading pictures. With the coded GOP structure information exposed at levels of Adaptation Sets and Representations or as SupplementalProperty, DASH client will have the option to perform a temporal processing with an application scheme toward seamless switching and random access.

The temporal processing scheme as disclosed above is able to decouple quality and resolution issues from two Representations when performing switching. When signalling the GOP structure with the number of leading pictures at a switching point, switching is possible at the switching point by decoding and presenting switch-from/original Representation up to switch point at time $t_s$, and continue decoding and presenting the switch-to/targeted Representation from time $t_s$ onwards. When HEVC is used as the media format in the segments, DASH client may set the decoding variable HandleCraAsBlaFlag equal to 1 and the decoding process in turn sets the variable NoRaslOutputFlag equal to HandleCraAsBlaFlag. With the settings, the time $t_s$ is the presentation time of I-picture of the switch-to Representation regardless of the number of RASL pictures. For a seamless switching, DASH client may set media decoder decodes pictures of the switch-from Representation up to the time $t_s$, which absorbs the presentation time span of the number RASL pictures of the switch-to Representation.

The present invention also discloses an extended concept of leading picture. The extended leading picture is defined as a picture that follows a given picture, an I-, P- or B-picture in decoding order, but precedes the given picture in output order. If the given picture can be correctly decoded, it then can be signalled as switching point or random access point for synchronization, as long as the defined leading pictures can be handled in a correct decoding and presentation process.

With the extended concept of leading picture, the present invention also proposes the text change for the pictures following the DRAP (Dependent Random Access Point) picture and clarification of marking pictures in DPB in D.3.36 of ISO/IEC 23008-2 to avoid the overly constrained statement and allow more generalized cases. The proposed text changes for the third and fourth paragraph in D.3.36 as follows:

Any pictures that follow the DRAP picture in decoding order shall not include, in its RPS, any picture that precedes the DRAP picture in output order or decoding order with the exception of the TRAP picture associated with the DRAP picture".

When performing random access at the DRAP picture, the value of PicOutputFlag should be set to 0 regardless of pic_output_flag for all pictures that precede the DRAP picture in decoding order and output order. And those preceding pictures except for the TRAP picture should be marked as "unused for reference" when starting decoding the DRAP picture.

Figure 8:
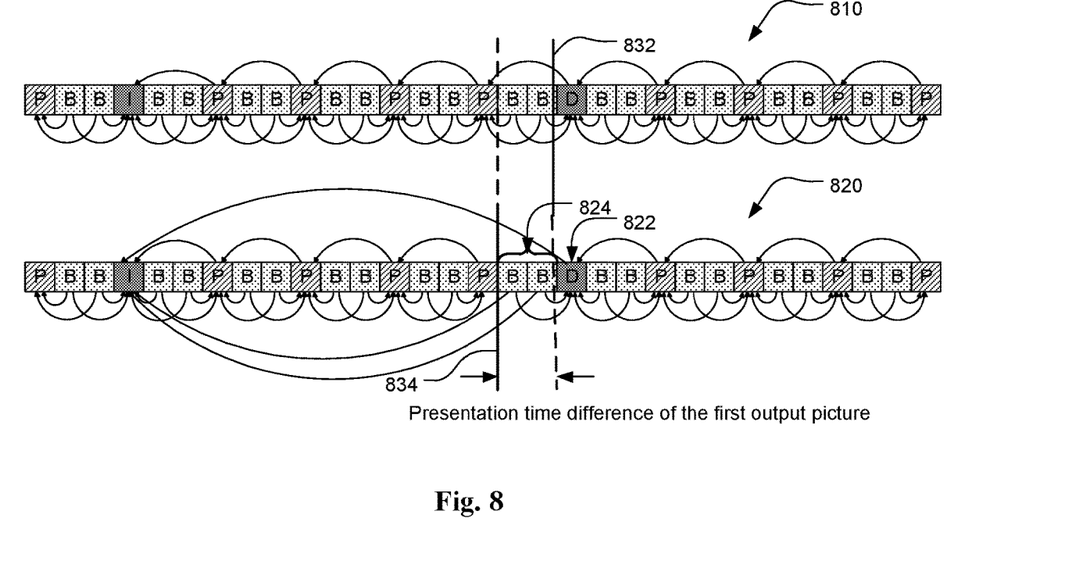
FIG. 8 illustrates an exemplary switching with random access point extended to a non-I picture according to an embodiment of the present invention.

The proposed text changes ensure all pictures follow the DRAP picture in decoding order can be correctly decoded and output. The pictures following the DRAP picture in decoding order also include the leading pictures of the DRAP picture. For the exemplary GOP structure (820) in FIG. 8, the two leading B pictures (824), which follow the DRAP picture (822) in decoding order but precede the DRAP picture in output order, only refer to the previous TRAP picture and the DRAP picture that are available in DPB. Thus the decoding process can correctly decode those two leading pictures and output them with an earlier presentation time associated with the DRAP picture. The presentation time difference of the first output picture before and after the proposed text change is as shown in FIG. 8, where the processing of GOP structure (810) corresponds to the conventional approach (i.e., without the proposed text changes). The solid lines (832, 834) indicate the presentation time accordingly.

In an another example of DASH streaming applications, when performing switching at DRAP pictures of Representations with aligned segments within an Adaptation Set, there will be no presentation gap between switch-from and switch-to Representations according to an embodiment of the present invention.

In MPEG File Format standard 14496-15 (ISO/IEC JTC1/SC29/WG11, *"Draft text* 14496-15 *FDIS* 4th *edition d*01", w15928, February 2016, San Diego, US), Sync Sample for the HEVC track is defined as "An HEVC sample is considered as a sync sample if the VCL NAL units in the sample indicate that the coded picture contained in the sample is an Instantaneous Decoding Refresh (IDR) picture, a Clean Random Access (CRA) picture, or a Broken Link Access (BLA) picture". It takes advantage of rich picture types in HEVC and opens more random access opportunities for applications than prior coding standards. Note a defect is identified that this definition may include I-picture as Sync Sample which has the associated RASL pictures, i.e. the open GOP case. For the RASL pictures, decoding process may encounter problematic issues of unavailable references.

In MPEG DASH standard 23009-1, "Draft Text of ISO/IEC 23009-1 3$^{rd}$ edition", w15686, October 2015, two elements of Switching and RandomAccess are added for signalling of switching within Adaptation Sets and random access to Representations. Actually the RandomAccess element can also be used to signal for switching (sometime seamless switching) within Adaptation Sets as long as a good care of open GOP structure is taken in signalling and decoding. There is no description in the standard if and how the RandomAccess element of an open GOP can be used as seamless switching points.

Random access point may be extended to a non-I picture when using the dependent RAP indication SEI (Supplemental Enhancement Information) message in ISO/IEC 23008-2, 3rd edition (ISO/IEC JTC1/SC29/WG11, *"Study Text of ISO/IEC DIS* 23008-2:201*X* 3*rd Edition"*, W15776, October 2015, Geneva, Switzerland). The sub-clause D.3.36 specifies relevant picture inclusion in RPS (Reference Picture Set) and setting of pic_output_flag for the DRAP (Dependent Random Access Point) picture and other related pictures. However, it is overly constrained for possible applications using the DRAP picture feature.

Accordingly, the present invention also discloses a method to link the application layer synchronization signalling to the setting of relevant decoding variables in the HEVC decoding process. This will enable the above described process for Sync Sample in the standard 14496-15 and RandomAccess in the standard 23009-1 for synchronization and switching applications.

In sub-clause 8.1.3 of the HEVC standard, the decoding process for a coded picture is described as follows.

When the current picture is an IRAP picture, the following applies:
If the current picture is an IDR picture, a BLA picture, the first picture in the bitstream in decoding order, or the first picture that follows an end of sequence NAL unit in decoding order, the variable NoRaslOutputFlag is set equal to 1.
Otherwise, if some external means not specified in this Specification is available to set the variable HandleCraAsBlaFlag to a value for the current picture, the variable HandleCraAsBlaFlag is set equal to the value provided by the external means and the variable NoRaslOutputFlag is set equal to HandleCraAsBlaFlag."

The decoding variable NoRaslOutputFlag is used to handle those Random Access Skipped Leading (RASL) pictures without interfering with the correct decoding process and presentation. Basically when NoRaslOutputFlag is equal to 1, the decoding process for generating unavailable reference pictures is invoked. The variable HandleCraAsBlaFlag can be set in terms of some external means and NoRaslOutputFlag can be set equal to HandleCraAsBlaFlag.

To correct the defect in 14496-15, the present invention also discloses the text change in 8.4.3 Sync Sample of 14496-15 by adding the following text to the first paragraph.

Using sync sample specified in this clause infers such an external means is available in a HEVC media format decoding process to set the corresponding variable HandleCraAsBlaFlag and consequently set NoRaslOutputFlag to ensure correct decoding and presentation.

As relevant to the above proposed change in 8.4.3 Sync Sample of ISO/IEC 14496-15, this invention proposes the following modification and addition in ISO/IEC 14496-12 for a loose definition of Sync Sample, since using SAP type defining Sync Sample in ISO/IEC 14496-12 may be no longer appropriate in the sense that SAP types serve as properties for the access point and onward, while Sync Samples serve as signalling or synchronization information for applications. The proposed text change in 3.1.17 sync sample of ISO/IEC 14496-12 with definition of sync sample as:

Sample in a track is a random access point (RAP), where the sample and succeeding samples in decoding order can all be correctly decoded or well handled by a media format decoding process; informally, a media sample that starts at the ISAU of a SAP of type 1 or 2 as defined in Annex I; a media sample that starts a new independent sequence of samples; if decoding starts at the sync sample, it and succeeding samples in decoding order can all be correctly decoded, including handling of those samples with a decoding need of unavailable reference samples, and the resulting set of decoded samples forms the correct presentation of the media starting at the decoded sample that has the earliest composition time; a media format may provide a more precise definition of a sync sample for that format.

The text change is proposed for the type of open GOP in 5.3.5.5 of ISO/IEC 23009-1 (w15686) to add as:
Using the RandonAccess signalling infers such an external means is available in a HEVC media format decoding process to set the corresponding variable Handle- CraAsBlaFlag and consequently set NoRaslOutputFlag to ensure a correct decoding and presentation.

As an example based on the standard 14496-15 for handling an open GOP, upon receiving signalling of Sync Sample per the standard 14496-15, client applications can set HandleCraAsBlaFlag to 'true' according to an embodiment of the present invention. As another example for handling an open GOP, upon receiving signalling of RandomAccess element per the standard 23009-1, client applications may set HandleCraAsBlaFlag to 'true'. In both cases, the HEVC decoding processes in the client applications consequently set NoRaslOutputFlag equal to HandleCraAsBlaFlag and ensure bitstreams to be correctly decoded without decoding failure.

Figure 9:
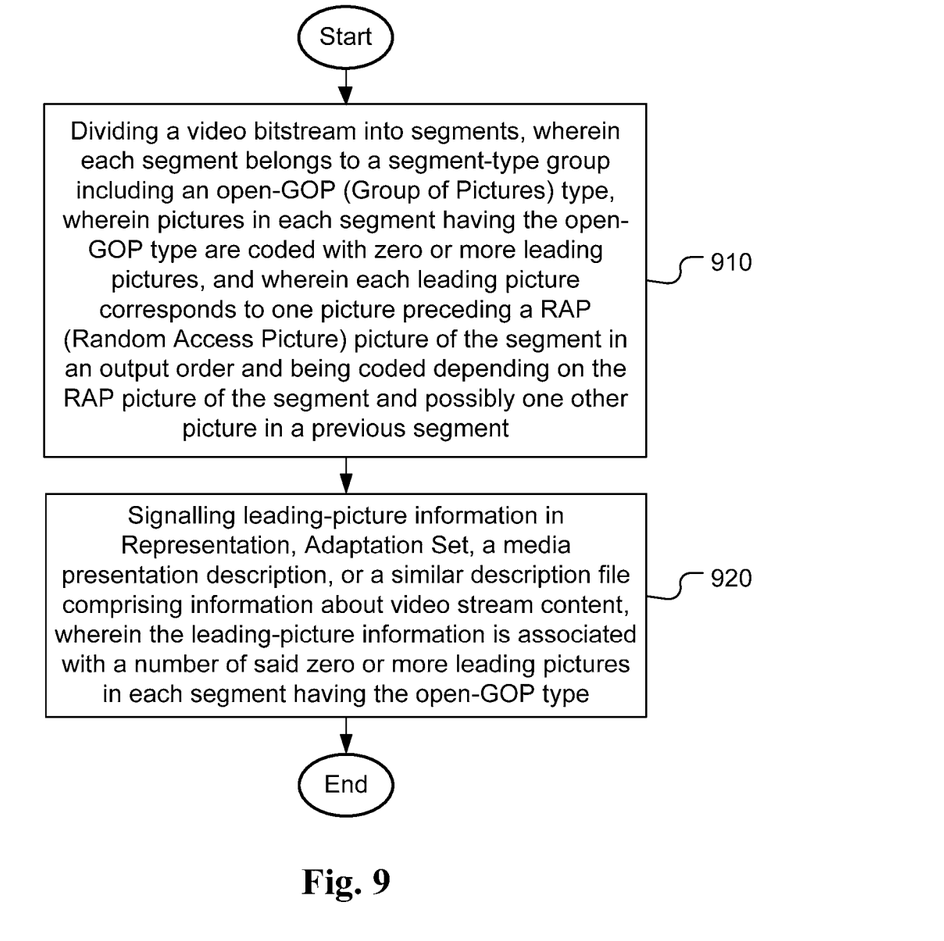
FIG. 9 illustrates an exemplary flowchart for switching Representations in a server side according to an embodiment of the present invention.

FIG. 9 illustrates an exemplary flowchart for switching Representations in a server side according to an embodiment of the present invention. The method divides a video bitstream into segments in step 910, wherein each segment belongs to a segment-type group including an open-GOP (Group of Pictures) type, wherein pictures in each segment having the open-GOP type are coded with zero or more leading pictures, and wherein each leading picture corresponds to one picture preceding a RAP (Random Access Picture) picture of the segment in an output order and being coded depending on the RAP picture of the segment and the picture in the previous segment. Leading-picture information is signalled in Representation, Adaptation Set, the media presentation description, or similar description file comprising information about the video stream content in step 920, wherein the leading-picture information is associated with a number of said zero or more leading pictures in each segment having the open-GOP type.

Figure 10:
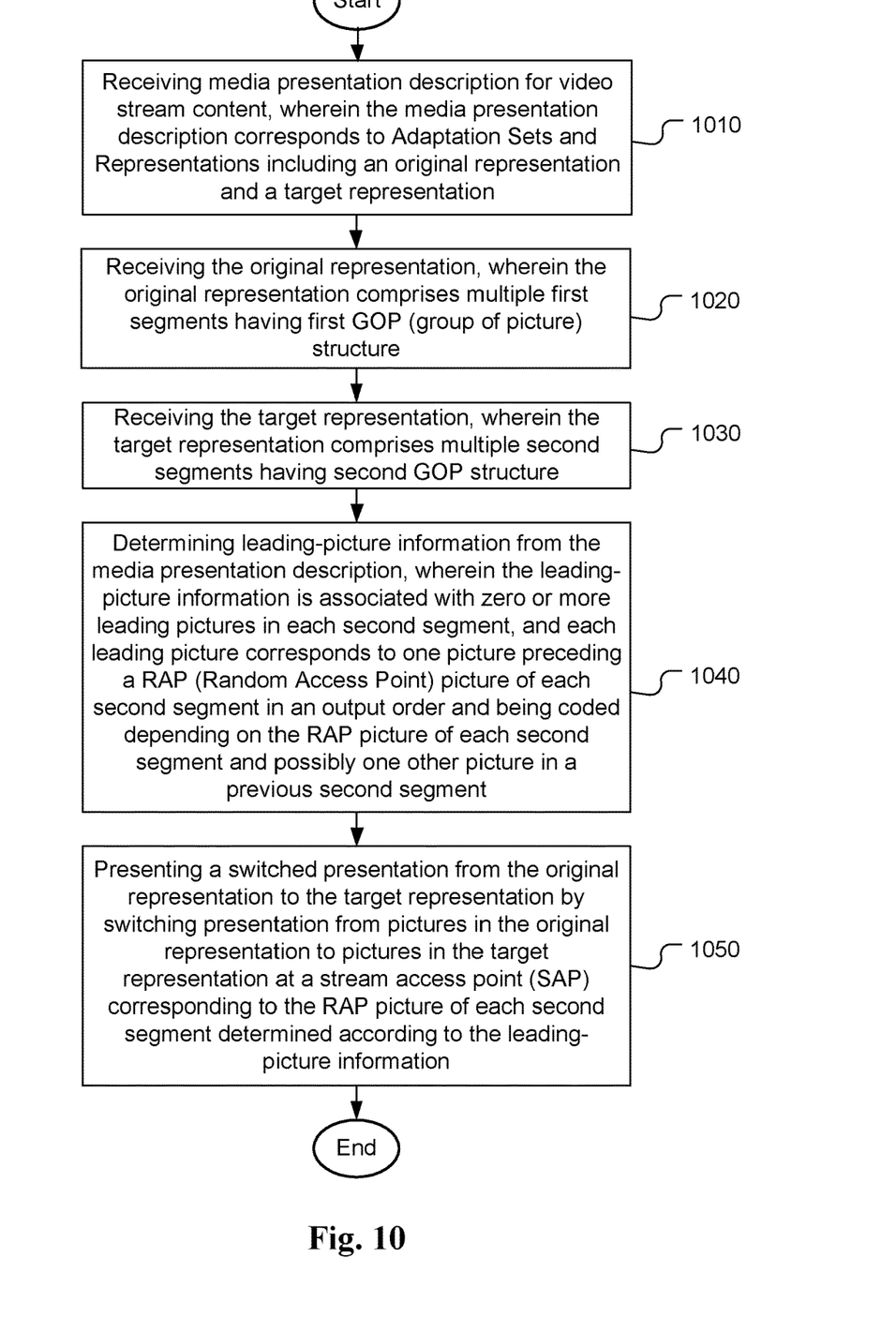
FIG. 10 illustrates an exemplary flowchart for switching Representations in a client side according to an embodiment of the present invention.

FIG. 10 illustrates an exemplary flowchart for switching Representations in a client side according to an embodiment of the present invention. The method firstly receives a media presentation description for video stream content, wherein the media presentation description corresponds to Adaptation Sets and Representations including an original representation and a target representation in step 1010. Then the method receives the original Representation in step 1020, where the original Representation comprises multiple first segments having first GOP (group of picture) structure. The target Representation is also received in step 1030, where the target Representation comprises multiple second segments having second GOP structure. Leading-picture information are determined from the media presentation description in step 1040, where the leading-picture information associated with zero or more leading pictures in each second segment and each leading picture corresponds to one picture preceding a RAP picture of each second segment in an output order and being coded depending on the RAP picture of each second segment and the picture in the previous second segment. A switched presentation is presented in step 1050, wherein the switched presentation corresponds to switching from the original representation to the target representation by switching presentation from pictures in the original representation to pictures in the target representation at a stream access point (SAP) corresponding to the RAP picture of each second segment determined according to the leading-picture information.

The flowchart shown above is intended to illustrate examples of seamless switching Representations for media streaming incorporating an embodiment of the present invention. A person skilled in the art may modify each step, re-arranges the steps, split a step, or combine the steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of media communication for a server and a client device, the method comprising:
    dividing a video bitstream into segments, wherein each segment belongs to a segment-type group including an open-GOP (Group of Pictures) type, wherein pictures in each segment having the open-GOP type are coded with zero or more leading pictures, and wherein each leading picture corresponds to one picture preceding a RAP (Random Access Picture) picture of the segment in an output order and being coded depending on the RAP picture of the segment and possibly one other picture in a previous segment; and
    signalling leading-picture information in Representation, Adaptation Set, a media presentation description, or a similar description file comprising information about video stream content, wherein the leading-picture information identifies a number of said zero or more leading pictures in each segment type group including the open-GOP type that are dependent upon a subsequent RAP picture in output order for decoding the zero or more leading pictures, the leading-picture information signalled using a supplemental property descriptor that includes a first indication to indicate to a decoder whether to continue to decode and present zero or more leading pictures in an original representation, wherein the supplemental property descriptor also includes a second indication, and wherein the second indication indicates to the decoder whether to always present a higher quality-ranking picture or a higher-resolution picture of two pictures from two streams to be switched at a stream access point (SAP).

2. The method of claim 1, wherein the RAP picture corresponds to an Intra picture.

3. The method of claim 1, wherein the RAP picture corresponds to a DRAP (dependent RAP) picture, where each DRAP picture corresponds to a P-picture or a B-picture.

4. The method of claim 1, wherein the leading-picture information is signalled using an attribute in the Representation or the Adaptation Set.

5. The method of claim 4, wherein the supplemental property descriptor is signalled in the Representation or the Adaptation Set.

6. A server device for media streaming to a client, the server device comprising:
an interface arranged to establish a communication connection with the client; and
one or more electronic circuits or processors configured to:
divide a video bitstream into segments, wherein each segment belongs to a segment-type group including an open-GOP (Group of Pictures) type, wherein pictures in each segment having the open-GOP type are coded with zero or more leading pictures, and wherein each leading picture corresponds to one picture preceding an Intra picture of the segment in an output order and coded depending on the Intra picture of the segment and possibly one other picture in a previous segment; and
signal leading-picture information in Representation, Adaptation Set, a media presentation description, or a similar description file comprising information about video stream content, wherein the leading-picture information identifies a number of said zero or more leading pictures in each segment type group including the open-GOP type that are dependent upon a subsequent RAP picture in output order for decoding the zero or more leading pictures, the leading-picture information signalled using a supplemental property descriptor that includes a first indication to indicate to a decoder whether to continue to decode and present zero or more leading pictures in an original representation,
wherein the supplemental property descriptor also includes a second indication, and wherein the second indication indicates to the decoder whether to always present a higher quality-ranking picture or a higher-resolution picture of two pictures from two streams to be switched at a stream access point (SAP).

7. A method of switching representations for a client device, the method comprising:
receiving a media presentation description for video stream content, wherein the media presentation description corresponds to Adaptation Sets and Representations including an original representation and a target representation;
receiving the original representation, wherein the original representation comprises multiple first segments having a first GOP (group of picture) structure;
receiving the target representation, wherein the target representation comprises multiple second segments having a second GOP structure;
determining leading-picture information from the media presentation description, wherein the leading-picture information is associated with a number (N) of zero or more leading pictures before an Intra picture in each second segment, and each leading picture corresponds to one picture preceding a RAP (Random Access Point) picture of each second segment in an output order and being coded depending on the RAP picture of each second segment and possibly one other picture in a previous second segment, wherein the leading-picture information identifies the number N of said zero or more leading pictures in each segment type group including the open-GOP type that are dependent upon the subsequent RAP picture in output order for decoding the zero or more leading pictures, wherein N is determined from a supplemental property descriptor, wherein the supplemental property descriptor includes a first indication to indicate to a decoder whether to continue to decode and present N leading pictures in the original representation; and
presenting a switched presentation from the original representation to the target representation by switching presentation from pictures in the original representation to pictures in the target representation at a stream access point (SAP) corresponding to the RAP picture of each second segment determined according to the leading-picture information,
wherein the supplemental property descriptor further includes a second indication to indicate to the decoder whether to always present a higher quality ranking picture or a higher-resolution picture of two pictures from two streams to be switched at the SAP.

8. The method of claim 7, wherein the RAP picture corresponds to an Intra picture.

9. The method of claim 8, wherein N is determined from an attribute in a Representation level or an Adaptation-Set level.

10. The method of claim 7, wherein when N is greater than 0 and the first indication has a value of 1, N pictures are decoded and presented in the original representation and then the Intra picture associated with the SAP of the target representation is decoded, and N leading pictures with presentation times smaller than presentation time of the Intra picture associated with the SAP of the target representation are discarded or set to be non-presented in a decoding process.

11. The method of claim 10, wherein when the second indication has a value of 1, one of the Intra picture associated with the SAP of the target representation and an anchor picture in the original representation at a same time as the SAP of the target representation that has a high quality ranking is presented.

12. The method of claim 11, wherein when the second indication has a value of 0, either the Intra picture associated with the SAP of the target representation or the anchor picture in the original representation at the same time as the SAP of the target representation is presented.

13. The method of claim 7, wherein when N is 0, the first indication is ignored.

14. The method of claim 7, wherein the RAP picture corresponds to a DRAP (dependent RAP) picture, where each DRAP picture corresponds to a P-picture or a B-picture.

15. The method of claim 14, wherein the leading-picture information corresponds to a number (N) of said zero or more leading pictures before the RAP picture in each second segment, and if N is greater than 0 and the RAP picture associated with the SAP of the target representation as Sync Sample is indicated, a first variable is set to indicate handling one Clean Random Access picture as one Broken Link Access picture and the first variable then is used to set a second variable to indicate decoding process for generating unavailable reference pictures corresponding to said handling one Clean Random Access picture as one Broken Link Access picture is invoked.

16. A client device for switching representations, the client device comprising:
an interface arranged to establish a communication connection with a server; and
one or more electronic circuits or processors configured to:
receive media presentation description for video stream content, wherein the media presentation description corresponds to Adaptation Sets and Representations including an original representation and a target representation;
receive the original representation, wherein the original representation comprises multiple first segments having first GOP (group of picture) structure;
receive the target representation, wherein the target representation comprises multiple second segments having second GOP structure;
determine leading-picture information from the media presentation description, wherein the leading-picture information is associated with a number (N) of zero or more leading pictures before an Intra picture in each second segment, and each leading picture corresponds to one picture preceding a RAP (Random Access Point) picture of each second segment in an output order and being coded depending on the RAP picture of each second segment and possibly one other picture in a previous second segment, wherein the leading-picture information identifies the number N of said zero or more leading pictures in each segment type group including the open-GOP type that are dependent upon the subsequent RAP picture in output order for decoding the zero or more leading pictures, wherein N is determined from a supplemental property descriptor, wherein the supplemental property descriptor includes a first indication to indicate to a decoder whether to continue to decode and present N leading pictures in the original representation; and
present a switched presentation from the original representation to the target representation by switching presentation from pictures in the original representation to pictures in the target representation at a stream access point (SAP) corresponding to the RAP picture of each second segment determined according to the leading-picture information,
wherein the supplemental property descriptor further includes a second indication to indicate to the decoder whether to always present a higher quality ranking picture or a higher-resolution picture of two pictures from two streams to be switched at the SAP.

* * * * *